United States Patent
Bykampadi et al.

(10) Patent No.: US 12,015,920 B2
(45) Date of Patent: Jun. 18, 2024

(54) SECURE ACCESS CONTROL IN COMMUNICATION SYSTEM

(71) Applicant: Nokia Technologies Oy, Espoo (FI)

(72) Inventors: Nagendra Bykampadi, Bangalore (IN); Laurent Thiebaut, Antony (FR); Anja Jerichow, Grafing bei München (DE); Suresh Nair, Whippany, NJ (US)

( * ) Notice: Subject to any disclaimer, the term of this patent is extended or adjusted under 35 U.S.C. 154(b) by 238 days.

(21) Appl. No.: 17/618,015

(22) PCT Filed: Jun. 9, 2020

(86) PCT No.: PCT/IB2020/055430
§ 371 (c)(1),
(2) Date: Dec. 10, 2021

(87) PCT Pub. No.: WO2020/254918
PCT Pub. Date: Dec. 24, 2020

(65) Prior Publication Data
US 2022/0248225 A1    Aug. 4, 2022

(30) Foreign Application Priority Data
Jun. 15, 2019 (IN) .............................. 201941023836

(51) Int. Cl.
*H04W 12/08* (2021.01)
*H04L 9/32* (2006.01)
*H04L 67/51* (2022.01)

(52) U.S. Cl.
CPC ........... *H04W 12/08* (2013.01); *H04L 9/3213* (2013.01); *H04L 67/51* (2022.05)

(58) Field of Classification Search
CPC ....... H04W 12/08; H04L 67/51; H04L 9/3213
See application file for complete search history.

(56) References Cited

U.S. PATENT DOCUMENTS 8,249,505 B1 * 8/2012 Goldner ................ H04W 48/18
455/41.2
10,785,652 B1 * 9/2020 Ravindranath ....... H04W 12/48
(Continued)

FOREIGN PATENT DOCUMENTS

CN      109688586 A     4/2019
EP        3879784 A1 *  9/2021 ......... H04L 63/0807
(Continued)

OTHER PUBLICATIONS

"3rd Generation Partnership Project; Technical Specification Group Core Network and Terminals; 5G System; Principles and Guidelines for Services Definition; Stage 3 (Release 15)", 3GPP TS 29.501, V15.3.0, Mar. 2019, 85 pages.
(Continued)

*Primary Examiner* — Adam D Houston
(74) *Attorney, Agent, or Firm* — Nokia Technologies Oy (57) ABSTRACT

Improved techniques for secure access control in communication systems are provided. In one example, in accordance with an authorization server function, a method comprises receiving a request from a service consumer in a communication system for access to a service type and one or more resources associated with the service type. The method determines whether the service consumer is authorized to access the service type and the one or more resources associated with the service type. The method generates an access token that identifies one or more service producers for the service type and the one or more resources associated with the service type that the service consumer is authorized to access, and sends the access token to the service consumer. The service consumer can then use the access token to access the one or more services and one or more resources. In addition to such resource level access
(Continued)

authorization, target network function group access authorization can be performed.

18 Claims, 9 Drawing Sheets

(56) References Cited

U.S. PATENT DOCUMENTS

| | | | |
|---|---|---|---|
| 11,317,321 B1* | 4/2022 | Paczkowski | H04W 28/06 |
| 11,425,636 B1* | 8/2022 | Aggarwal | H04W 12/08 |
| 2014/0223516 A1 | 8/2014 | Vongsouvanh et al. | |
| 2018/0077140 A1* | 3/2018 | Vongsouvanh | H04W 12/06 |
| 2019/0007421 A1* | 1/2019 | D | H04L 63/0807 |
| 2021/0027091 A1* | 1/2021 | Charry | H04L 41/122 |
| 2021/0258316 A1* | 8/2021 | Liu | H04L 63/0876 |
| 2022/0029976 A1* | 1/2022 | Ericksen | H04L 67/02 |
| 2022/0116400 A1* | 4/2022 | Khare | H04W 12/08 |
| 2022/0191028 A1* | 6/2022 | Aggarwal | H04L 9/3247 |
| 2022/0240089 A1* | 7/2022 | Bykampadi | H04L 63/0807 |
| 2022/0248225 A1* | 8/2022 | Bykampadi | H04W 12/08 |
| 2022/0272537 A1* | 8/2022 | Aggarwal | H04W 12/084 |
| 2022/0353255 A1* | 11/2022 | S Bykampadi | G06F 21/44 |
| 2022/0360586 A1* | 11/2022 | Aggarwal | H04L 63/102 |
| 2023/0171255 A1* | 6/2023 | Kuravangi-Thammaiah | H04L 63/10 726/7 |
| 2023/0308429 A1* | 9/2023 | Landais | H04L 67/56 |

FOREIGN PATENT DOCUMENTS

| | | | |
|---|---|---|---|
| WO | 2019/076801 A1 | 4/2019 | |
| WO | WO-2021094349 A1 * | 5/2021 | H04L 63/0807 |
| WO | WO-2022018580 A1 * | 1/2022 | |

OTHER PUBLICATIONS

"3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.

"3rd Generation Partnership Project; Technical Specification Group Services and System Aspects; Security architecture and procedures for 5G system (Release 15)", 3GPP TS 33.501, V15.4.0, Mar. 2019, pp. 1-187.

"3rd Generation Partnership Project; Technical Specification Group Services and System Aspects; Procedures for the 5G System; Stage 2 (Release 16)", 3GPP TS 23.502, V16.0.2, Apr. 2019, pp. 1-419.

"3rd Generation Partnership Project; Technical Specification Group Core Network and Terminals; 5G System; Network Function Repository Services; Stage 3 (Release 15)", 3GPP TS 29.510, V15.3.0, Mar. 2019, pp. 1-121.

International Search Report and Written Opinion received for corresponding Patent Cooperation Treaty Application No. PCT/IB2020/055430, dated Sep. 10, 2020, 13 pages.

"3rd Generation Partnership Project; Technical Specification Group Core Network and Terminals; 5G System; Technical Realization of Service Based Architecture; Stage 3 (Release 15)", 3GPP TS 29.500, V15.0.0, Jun. 2018, pp. 1-28.

Hardt, "The OAuth 2.0 Authorization Framework", RFC 6749, Internet Engineering Task Force, Oct. 2012, pp. 1-76.

Office action received for corresponding Indian Patent Application No. 201941023836, Oct. 17, 2023, 6 pages.

Office action received for corresponding Chinese Patent Application No. 202080043695.5, dated Jan. 30, 2024, 8 pages of office action and no page of translation available.

"Clarification on service authorization and token verification", 3GPP TSG-SA WG3 Meeting #94, S3-190440, Huawei, Jan. 28-Feb. 1, 2019, 8 pages.

* cited by examiner

| Attribute name | Data type | P | Cardinality | Description |
|---|---|---|---|---|
| grant_type | GrantType | M | 1 | This IE shall contain the grant type as "client_credentials" |
| nfInstanceId | NfInstanceId | M | 1 | This IE shall contain the NF instance id of the NF service consumer. |
| nfType | NFType | C | 0..1 | This IE shall be included when the access token request is for an NF type and not for a specific NF / NF service instance. When present, this IE shall contain the NF type of the NF service consumer. |
| targetNfType | NFType | C | 0..1 | This IE shall be included when the access token request is for an NF type and not for a specific NF / NF service instance. When present, this IE shall contain the NF type of the NF service producer. |
| Scope | string | M | 1 | This IE shall contain the NF service name(s) of the NF service producer(s), separated by whitespaces, as described in IETF RFC 6749 [16], section 3.3.<br><br>The service name(s) included in this attribute shall be any of the services defined in the ServiceName enumerated type (see subclause 6.1.6.3.11).<br><br>pattern: "^[a-zA-Z0-9_-]+( [a-zA-Z0-9_-]+)*$"<br><br>See NOTE 2 |
| targetNfInstanceId | NfInstanceId | C | 0..1 | This IE shall be included, if available and if it is an access token request for a specific NF Service Producer. When present this IE shall contain the NF Instance ID of the specific NF Service Producer for which the access token is requested. |
| requesterPlmn | PlmnId | C | 0..1 | This IE shall be included when the NF service consumer in one PLMN requests a service access authorization for an NF service producer from a different PLMN.<br>When present, this IE shall contain the PLMN ID of the requester NF service consumer. |
| targetPlmn | PlmnId | C | 0..1 | This IE shall be included when the NF service consumer in one PLMN requests a service access authorization for an NF service producer from a different PLMN.<br>When present, this IE shall contain the PLMN ID of the target PLMN (i.e., PLMN ID of the NF service producer). |
| Data-set | DataSet Id | O | 0..1 | Indicates the data set to be supported by the NF to be discovered. May be included if the target NF type is "UDR" |
| Target NF Group | Target NF Group Id | | | Indicates the NF Group Id to be supported by the NF to be discovered. May be included if the target NF type is "UDR", "UDM", "AUSF" or "PCF" |

NOTE 1: This data structure shall not be treated as a JSON object. It shall be treated as a key, value pair data structure to be encoded using x-www-urlencoded format as specified in subclause 17.13.4.1 of W3C HTML 4.01 Specification [26].
NOTE 2: Though scope attribute is optional as per IETF RFC 6749 [16], it is mandatory for 3GPP as per 3GPP TS 33.501 [15]

FIG. 5

| Attribute name | Data type | P | Cardinality | Description |
|---|---|---|---|---|
| iss | NfInstanceId | M | 1 | This IE shall contain NF instance id of the NRF, corresponding to the standard "Issuer" claim described in IETF RFC 7519 [25], section 4.1.1 |
| sub | NfInstanceId | M | 1 | This IE shall contain the NF instance ID of the NF service consumer, corresponding to the standard "Subject" claim described in IETF RFC 7519 [25], section 4.1.2. |
| aud | Audience | M | 1 | This IE shall contain the NF service producer's NF instance ID(s) (if the exact NF instance(s) of the NF service producer is known) or the NF type of NF service producers for which the claim is applicable, corresponding to the standard "Audience" claim described in IETF RFC 7519 [25], section 4.1.3. |
| scope | string | M | 1 | This IE shall contain the name of the NF services for which the access_token is authorized for use; this claim corresponds to a private claim, as described in IETF RFC 7519 [25], section 4.3.<br><br>pattern: "^([a-zA-Z0-9_-]+)( [a-zA-Z0-9_-]+)*$" |
| exp | integer | M | 1 | This IE shall contain the number of seconds after which the access_token is considered to be expired, corresponding to the standard "Expiration Time" claim described in IETF RFC 7519 [25], section 4.1.4. |
| allowedResources | string | O | 1 | When present, contains the resource URI(s) of the data set(s) the consumer is allowed to access.<br><br>When the audience (i.e. the service producer) is of type "UDR", this claim is mandatory to be included in the access token |
| allowedNFGroupId | String | O | ... | May contain a white list of allowed NF Group Id or a black list of NF Group Id that the consumer is not allowed to target |

SECURE ACCESS CONTROL IN COMMUNICATION SYSTEM

RELATED APPLICATION

This application was originally filed as PCT Application No. PCT/IB2020/055430, filed on Jun. 9, 2020, which claims priority from Indian Application No. 201941023836, filed on Jun. 15, 2019, each of which is incorporated herein by reference in its entirety.

FIELD

The field relates generally to communication systems, and more particularly, but not exclusively, to secure access control within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB or N3IWF or TNGF or W-AGF depending on the type of 5G Access Network: supporting NR radio defined by 3GPP, supporting an Untrusted Non 3GPP access to 5GC, supporting a Trusted Non 3GPP access to 5GC (5G Core) or supporting a Wireline access to 5GC) is illustratively part of an access network of the communication system. For example, in a 5G network, the access network referred to as a 5G AN is described in 5G Technical Specification (TS) 23.501, V16.0.2, entitled "Technical Specification Group Services and System Aspects; System Architecture for the 5G System," the disclosure of which is incorporated by reference herein in its entirety. In general, the access point (e.g., gNB or N3IWF or TNGF or W-AGF depending on the type of 5G Access Network) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.4.0, entitled "Technical Specification Group Services and System Aspects; Security Architecture and Procedures for the 5G System," the disclosure of which is incorporated by reference herein in its entirety, further describes security management details associated with a 5G network.

Access of network entities is an important security management consideration in any communication system. However, secure access in certain circumstances presents several challenges.

SUMMARY

Illustrative embodiments provide improved techniques for secure access control in communication systems.

For example, in one illustrative embodiment in accordance with an authorization server function, a method comprises receiving a request from a service consumer in a communication system for access to a service type and one or more resources associated with the service type. The method determines whether the service consumer is authorized to access the service type and the one or more resources associated with the service type. The method generates an access token that identifies one or more service producers for the service type and the one or more resources associated with the service type that the service consumer is authorized to access, and sends the access token to the service consumer. The service consumer can then use the access token to access the one or more services and one or more resources.

In another illustrative embodiment in accordance with an authorization server function, a method comprises receiving a request from a service consumer in a communication system for access to a service type. The method determines whether the service consumer is authorized to access the service type and one or more network function groups associated with the service type. The method generates an access token that identifies one or more service producers for the service type and one or more network function groups associated with the service type that the service consumer is or is not authorized to access, and sends the access token to the service consumer. The service consumer can then use the access token to access the one or more services.

In illustrative embodiments, the service consumer is a network function (NF) and the authorization server function is a network repository function (NRF) in a 5G System.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps. Also, methods, non-transitory computer-readable storage media, and apparatus from the perspective of the service consumer are provided in other embodiments.

Advantageously, illustrative embodiments provide level of access authorization that not only allows authorization at a service level, but also performs resource level access authorization, as well as group level authorization.

These and other features and advantages of embodiments described herein will become more apparent from the accompanying drawings and the following detailed description.

BRIEF DESCRIPTION OF THE DRAWINGS

FIG. 6 illustrates a table of access token claim types, according to an illustrative embodiment.

DETAILED DESCRIPTION

Embodiments will be illustrated herein in conjunction with example communication systems and associated techniques for providing secure access control of network entities in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. For example, 3GPP TS 23.502, V16.0.2, entitled "Technical Specification Group Services and System Aspects; Procedures for the 5G System; Stage 2," as well as in 3GPP TS 29.510, V15.3.0, entitled "Technical Specification Group Core Network and Terminals; 5G System; Network Function Repository Services," the disclosures of which are incorporated by reference herein in their entireties, will be referenced below. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to key management associated with the Service-Based Architecture (SBA) for 5G networks. Prior to describing such illustrative embodiments, a general description of main components of a 5G network will be described below in the context of FIGS. 1 and 2.

Figure 1:
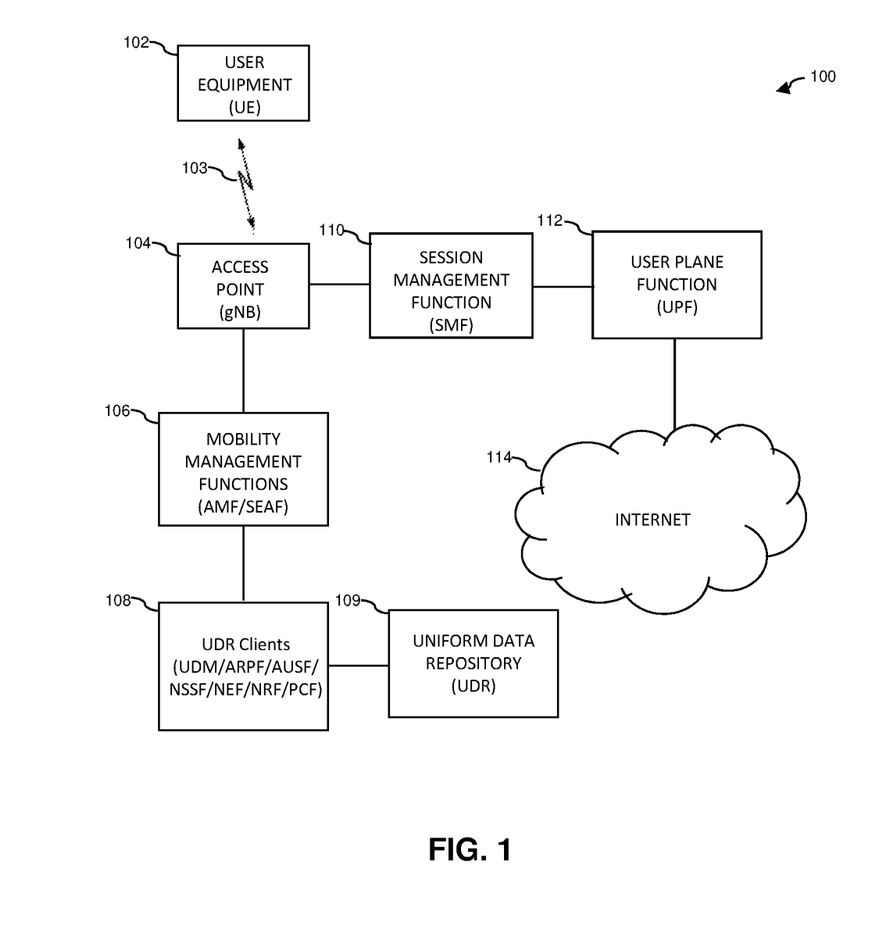
FIG. 1 illustrates a communication system with which one or more illustrative embodiments are implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used in other embodiments to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point 104 (gNB or N3IWF or TNGF or W-AGF depending on the type of 5G Access Network). The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device. Such communication devices are also intended to encompass devices commonly referred to as access terminals. In other embodiments, the UE could be hosted by a Residential Gateway connected to 5G Core via Wireline access.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to subscriber functions, e.g., one or more functions that are resident in the home network of the subscriber or elsewhere. Some of these functions include the Unified Data Management (UDM) function, as well as an Authentication Server Function (AUSF). The AUSF and UDM (separately or collectively) are also referred to herein, more generally, as an authentication entity. The UDM supports an Authentication Credential Repository and Processing Function (ARPF) which typically stores long-term security credentials used in authentication. In addition, subscriber functions include, but are not limited to, Network Slice Selection Function (NSSF), Network Exposure Function (NEF), Network Repository Function (NRF), and Policy Control Function (PCF). One or more of the subscriber functions may be operatively coupled to a Unified Data Repository (UDR) 109, and thus considered UDR clients 108, which will be discussed in further detail below.

In illustrative embodiments, the subscriber of the UE maintains a mobile subscription with the operator of the core network or another mobile network. Note that a UE is typically subscribed to what is referred to as a Home Public Land Mobile Network (HPLMN) in which some or all of the subscriber functions reside. If the UE is roaming (not in the HPLMN), it is typically connected with a Visited Public Land Mobile Network (VPLMN) also referred to as a serving network. Some or all of the mobility management functions 106 may reside in the VPLMN, in which case, functions in the VPLMN communicate with functions in the HPLMN as needed. However, in a non-roaming scenario, mobility management functions 106 and UDR clients 108 can reside in the same communication network or elsewhere as needed.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of PDU sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between network functions (NFs) and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via access point 104 (gNB or N3IWF or TNGF or W-AGF depending on the type of 5G Access Network). NFs can also access services of other NFs.

Figure 2:
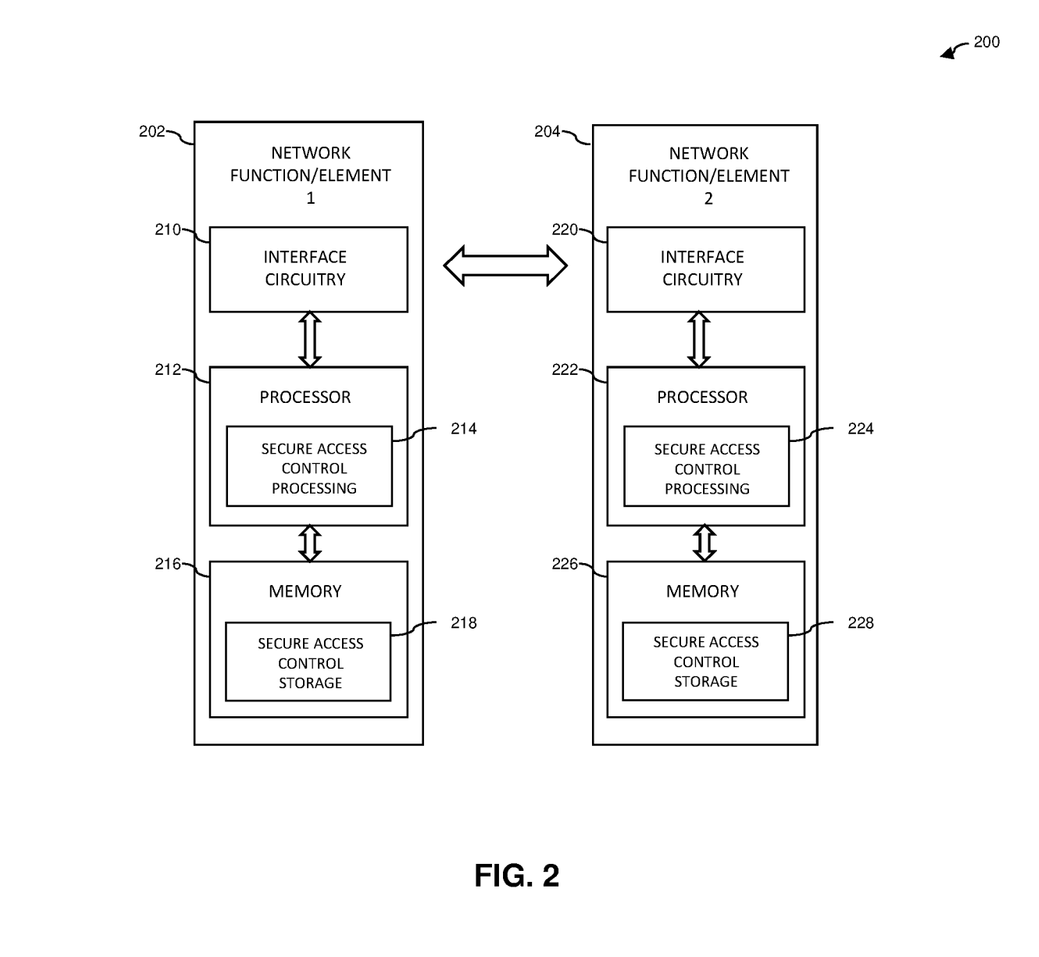
FIG. 2 illustrates processing architectures for network entities involved in secure access control in a communication system, according to an illustrative embodiment.

FIG. 2 is a block diagram of processing architectures 200 of two components (e.g., network entities which can include network functions and other network elements of the communication system) involved in secure access control in a communication system in an illustrative embodiment. It is to be appreciated that more than two components may be involved in secure access control according to illustrative embodiments. As such, FIG. 2 illustrates processing architectures associated with any two of the components that directly or indirectly communicate. Therefore, in illustrative embodiments, each participant in a secure access control methodology is understood to be configured with the processing architecture shown in FIG. 2.

As shown, a network function/element 202 comprises a processor 212 coupled to a memory 216 and interface circuitry 210. The processor 212 of the network function/element 202 includes a secure access control processing module 214 that may be implemented at least in part in the form of software executed by the processor. The processing module 214 performs secure access control described in conjunction with subsequent figures and otherwise herein. The memory 216 of the network function/element 202 includes a secure access control storage module 218 that stores data generated or otherwise used during secure access control operations.

As further shown, a network function/element 204 comprises a processor 222 coupled to a memory 226 and interface circuitry 220. The processor 222 of the network function/element 204 includes a secure access control processing module 224 that may be implemented at least in part in the form of software executed by the processor 222. The processing module 224 performs secure access control described in conjunction with subsequent figures and otherwise herein. The memory 226 of the network function/element 204 includes a secure access control storage module 228 that stores data generated or otherwise used during secure access control operations.

The processors 212 and 222 of the respective components 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective components 202 and 204 may be used to store one or more software programs that are executed by the respective processors 212 and 222 to implement at least a portion of the functionality described herein. For example, secure access control operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective components 202 and 204 illustratively comprise transceivers or other communication hardware or firmware that allows the associated system elements to communicate with one another in the manner described herein.

It is apparent from FIG. 2 that the network function/element 202 is configured for communication with the network function/element 204 and vice-versa via their respective interface circuitries 210 and 220. This communication involves the network function/element 202 sending data to the network function/element 204, and the network function/element 204 sending data to the network function/element 202. However, in alternative embodiments, other network elements or other components may be operatively coupled between, as well as to, the components 202 and 204. The term "data" as used herein is intended to be construed broadly, so as to encompass any type of information that may be sent between components including, but not limited to, messages, tokens, identifiers, keys, indicators, user data, control data, authentication data, etc.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

In illustrative embodiments, as will be further explained below, the network function/element 202 is an NF such as a UDM, PCF or NEF, and the network function/element 204 is an NF such as an NRF (authorization server).

Given the above illustrative architectures, illustrative embodiments of secure access control between one or more NFs will be further described below. Prior to such descriptions, some main drawbacks that at least partially motivated development of illustrative embodiments will be described in the context of a 5G network.

While two NFs that need to communicate (e.g., one NF gains access to another NF's service(s)) can be in different PLMNs, some NFs in the same PLMN also have a need to communicate. In either scenario (inter-PLMN communication or intra-PLMN communication), the SBA communication model includes security methods that enable an "NF service consumer" (service client) to be authenticated and authorized to access a service provided by or otherwise associated with an "NF service producer" (service server). One of the supported authorization methods in the above-referenced 3GPP TS 33.501 (Release 15) is based on the OAuth 2.0 (referred to simply herein as "OAuth") access token methodology. In a 5G system, the following model is adopted when OAuth is used: (i) the NRF is the OAuth authorization server; (ii) the NF service consumer is the OAuth client; and (iii) the NF service producer is the OAuth resource server.

The NF service consumer (client) discovers the NF service producer (resource server) via the NRF, and then obtains an access token to present to the NF service producer when invoking the service application programming interface (API) request.

In 5G SBA, service access authorization based on OAuth is only at service level and not at a resource level (e.g., data/dataset level or NF group level) accessible via the service. In other words, 23.501/23.502 allow only at service level to restrict which NFs are allowed to consume a service. Each service allows a set of operations (methods), but access and update are regulated on service level only. There is no existing way to check whether the NF consumer is authorized to access specific datasets or other resources accessible via the service.

Figure 3:
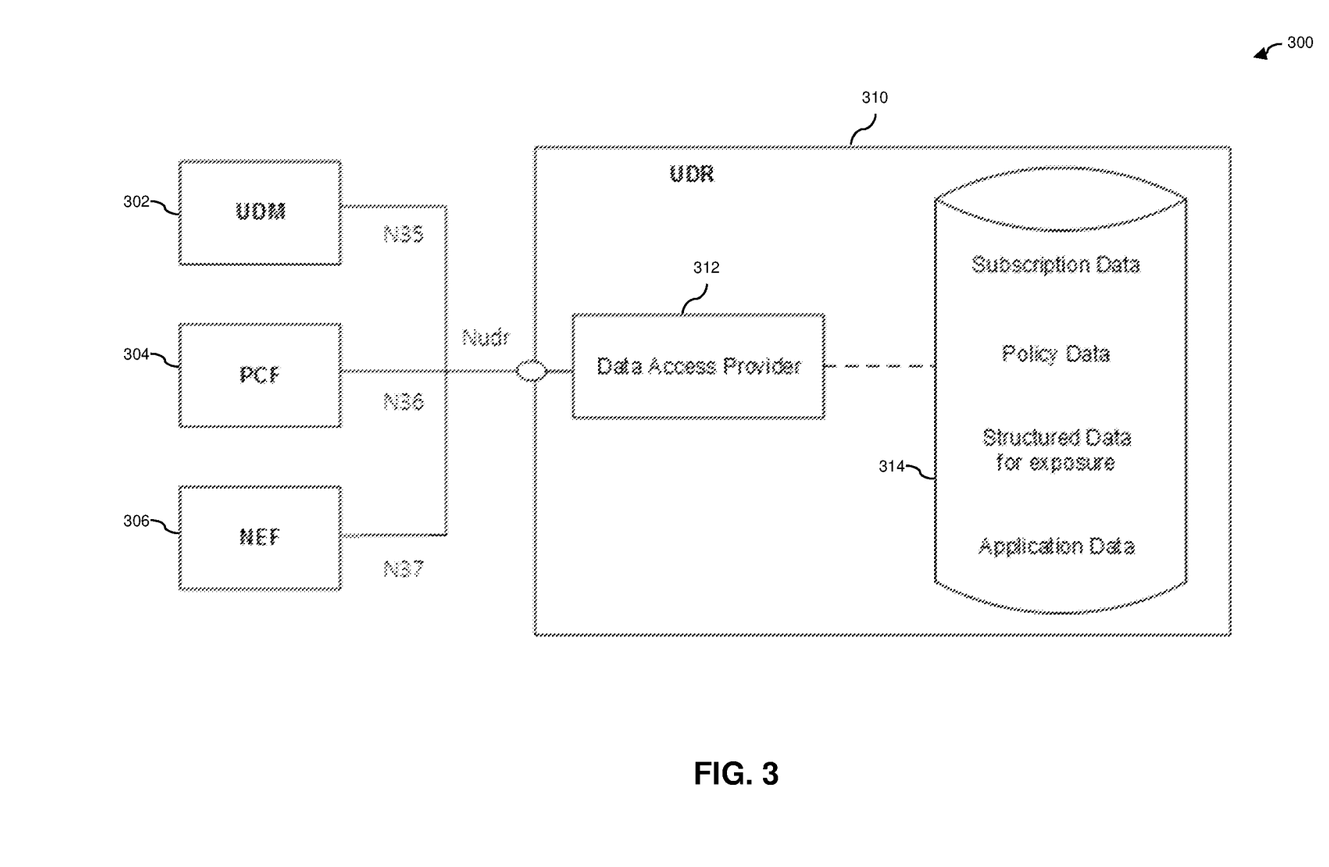
FIG. 3 illustrates a data storage architecture with which one or more illustrative embodiments are implemented.

This problem creates a fundamental issue specifically with the UDR as depicted in FIG. 3. Note that a UDR can itself be considered an NF. The functionalities supported by a UDR are defined in clause 6.2.11 of TS 23.501 and include, for example, storage and retrieval of subscription data by the UDM, storage and retrieval of policy data by the PCF, storage and retrieval of structured data for exposure, etc.

FIG. 3 illustrates a data storage architecture 300 in a 5G System. More particularly, as shown, UDM 302, PCF 304 and NEF 306 are operatively coupled to UDR 310. UDR 310 comprises a data access provider module 312 and a data storage 314. UDR 310 provides one Nudr_DataRepository (as shown, Nudr) service to all the NF consumers (e.g., in this example, UDM 302, PCF 304 and NEF 306). Any NF can use the Nudr interface to access resources managed by UDR 310 including, as shown, Subscription Data (of UEs), Policy Data, Structured Data for Exposure, and Application Data. There is no specific access permission to UDR operations with Nudr_DataRepository service.

The following Data Set Identifiers are currently defined: Subscription Data, Policy Data, Application data and Data for Exposure. UE's subscription information (Subscription Data) is very sensitive information and must only be accessible to UDM NFs. Other NFs, such as NEF or PCF, must not be able to obtain access to the Nudr_DataRepository service and then have free access to all types of data including UE's subscription data. Thus, it would be desirable to restrict the UDM to only access data related with Subscription Data Set Identifier=Subscription Data.

As another example, it would be desirable to restrict PCF to only access data related with Data Set Identifier=Policy Data.

In general, it is realized herein that different types of data within a NF may have different data access authorizations. The NF must be able to have the authorization management mechanism to guarantee the safety of data access.

Another feature that would be desirable is to restrict consumer access on a per NF producer group identifier (Id) basis. For example, this feature is to only allow some UDM (respectively AUSF or UDM or PCF) consumers to access some UDM (respectively AUSF or UDM or PCF) NF Group Id(s). For example, this feature is meant to associate some UDM (respectively AUSF or UDM or PCF) Group Id(s) to some set of corporate users or to Public Safety users and to restrict the access to the NF instances (serving these specific Group Id(s)) to some specific consumer NF (e.g. associated with some specific slices).

Illustrative embodiments provide the above-mentioned and other desired features. For example, in some embodiments, UDR data set-based access control is provided wherein the idea is to enhance OAuth procedures to convey additional information in the access token (e.g., JavaScript Object Notation (JSON) Web Token) that enables the NF producer to verify whether the requesting NF (NF consumer) is authorized to access resources/datasets managed by the NF producer. In other embodiments, group Id-based access control is provided wherein the idea is to enhance OAuth procedures to convey additional information in the JSON Web Token that enables the NF producer to verify whether the requesting NF (NF consumer) is authorized to access resources related with a Group Id served by the NF producer.

That is, illustrative embodiments add level of access authorization that not only allows authorization at the NF service level, but goes one level beyond by performing resource level access authorization on API requests from NF consumers.

For example, in one or more illustrative embodiments, as part of the discovery procedure, the NRF checks whether the NF consumer is allowed to access the requested resource/data set.

Based on the profile of the expected NF/NF service, the type of the NF service consumer and the requested dataset, the NRF determines whether the NF service consumer is allowed to discover the expected NF instance(s).

When access to the requested dataset is not allowed for NF type of the NF consumer, the NRF rejects the discovery request.

When access to the requested Group Id is not allowed for NF type of the NF consumer, the NRF rejects the discovery request.

In the access token request (i.e., Nnrf_AccessToken_Get Request), the NF service consumer includes the name of the Dataset (data-set) and/or Group Id it would like to access. This is depicted in FIGS. 4A and 4B respectively.

Figure 4A:
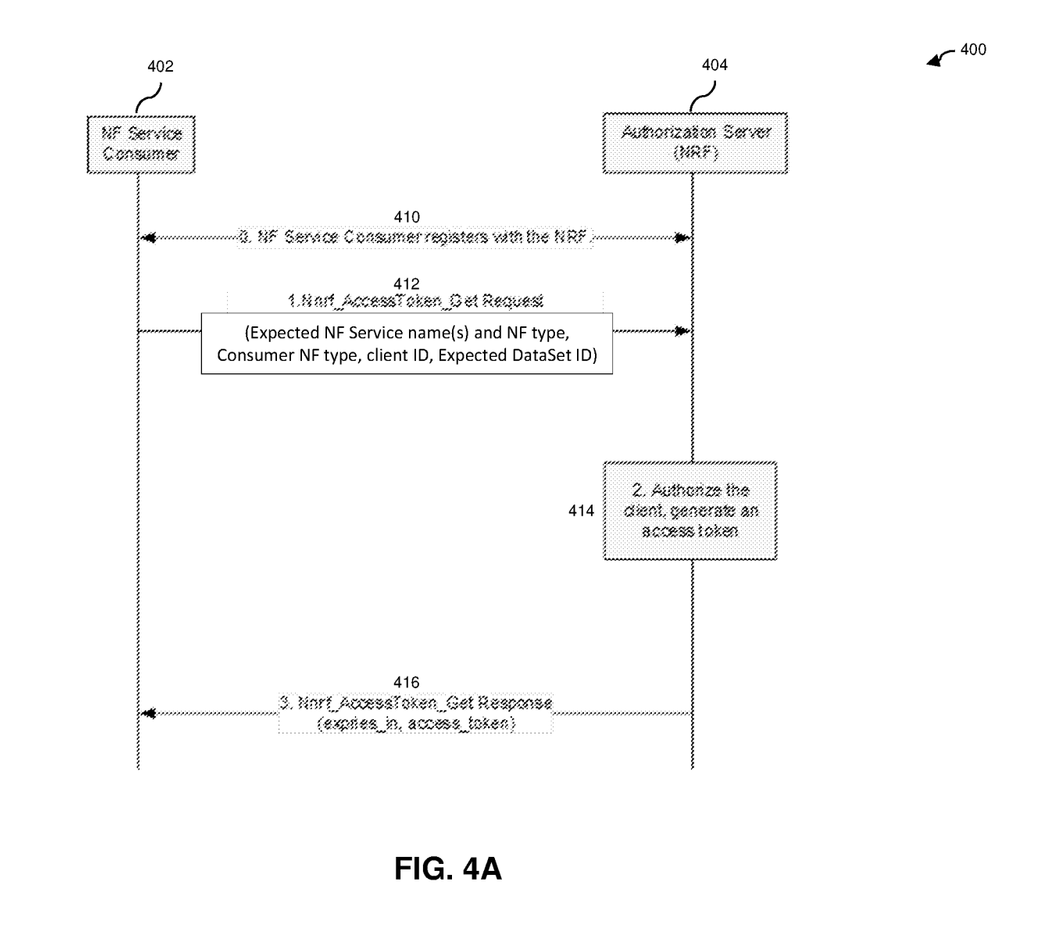
FIG. 4A illustrates a message flow for a secure allowed-resource access control methodology in a communication system, according to an illustrative embodiment.
Figure 4B:
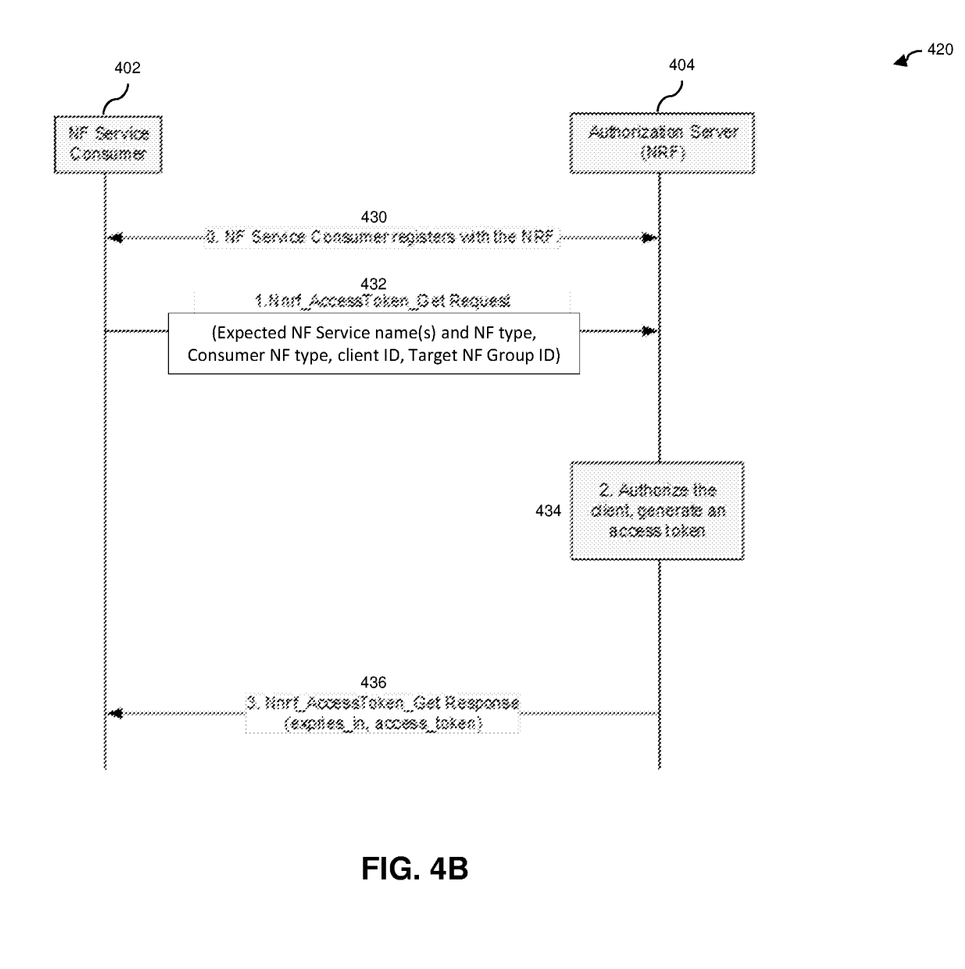
FIG. 4B illustrates a message flow for a secure allowed-group access control methodology in a communication system, according to another illustrative embodiment.

As shown in message flow 400 in FIG. 4A (Dataset ID), in step 410, NF Service Consumer 402 registers with NRF 404 (authorization server).

In step 412, NF Service Consumer 402 sends an access token request to NRF 404. As shown, the access token request includes the Expected NF Service name(s), NF type, Consumer NF type, OAuth client ID, and Expected Dataset ID.

In step 414, NRF 404 authorizes the client and generates an access token.

In step 416, NRF 404 sends an access token response (i.e., Nnrf_AccessToken_Get Response) to NF Service Consumer 402.

If NF Service Consumer 402 is authorized to access the data set within the target NF, the NRF 404 includes all the resources (uniform resource identifiers (URIs)) in the access token.

As shown in message flow 420 in FIG. 4B (Target NF Group ID), in step 430, NF Service Consumer 402 registers with NRF 404 (authorization server).

In step 432, NF Service Consumer 402 sends an access token request to NRF 404. As shown, the access token request includes the Expected NF Service name(s), NF type, Consumer NF type, OAuth client ID, and Target NF Group ID.

In step 434, NRF 404 authorizes the client and generates an access token.

In step 436, NRF 404 sends an access token response (i.e., Nnrf_AccessToken_Get Response) to NF Service Consumer 402.

If NF Service Consumer 402 is authorized to access the target NF group, the NRF 404 includes an indication of the group and/or group members in the access token.

Note that in some embodiments, the NF Service Consumer 402 does not include a Target NF Group ID in its access token request. In such case, for example, only if the NF Service Consumer 402 is known to be associated with some slices would the NRF 404 grant access to some UDM/UDR group ID(s).

Accordingly, the NF Service Consumer 402 can issue a request that contains one or more group IDs or the request may not contain any group ID. The NRF 404 could then issue a token related with one or more group IDs as appropriate (possibly relating to authorized group IDs or forbidden group IDs) regardless of whether the NF service consumer request contained a group ID.

Note also that in illustrative embodiments, an access token has an expiration time associated therewith.

Figure 5:
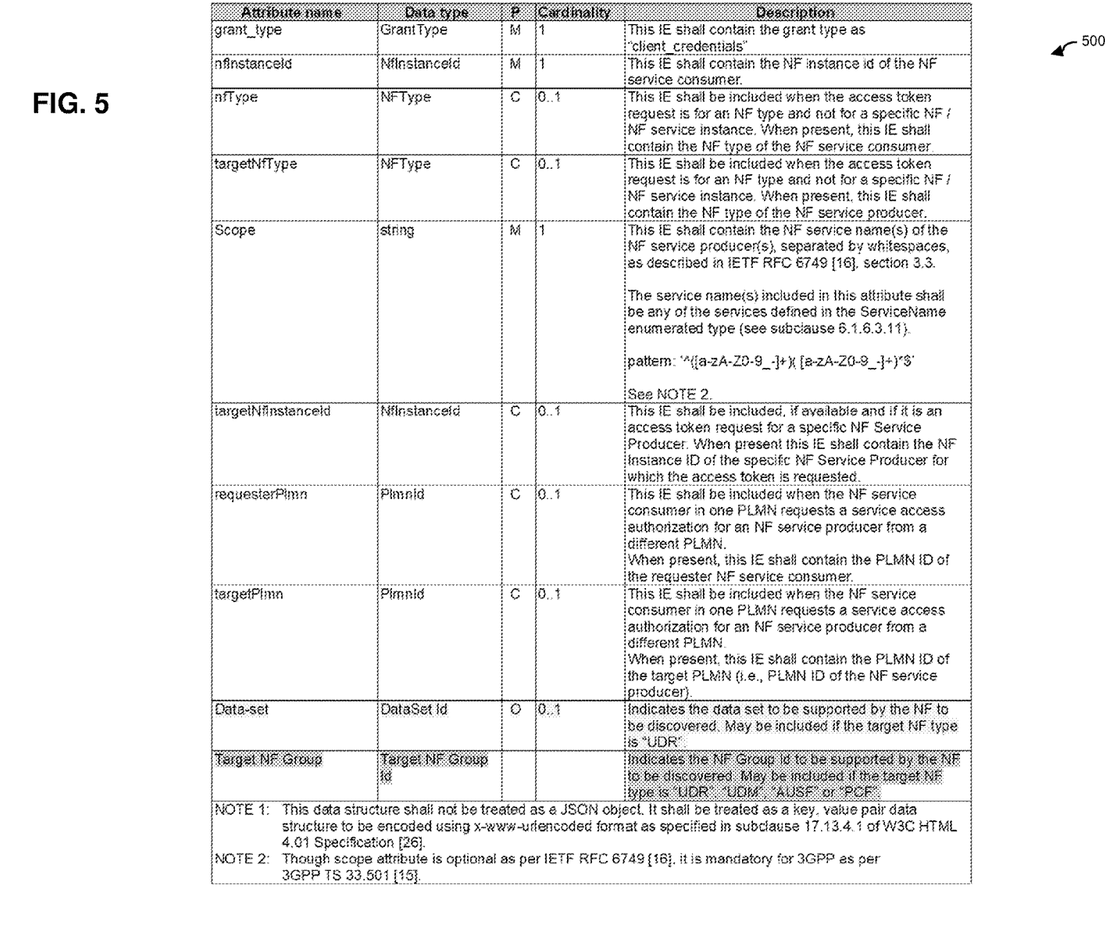
FIG. 5 illustrates a table of access token request types, according to an illustrative embodiment.

FIG. 5 illustrates a table 500 of access token request types, according to an illustrative embodiment. Note that the bottom of the table indicates the new Dataset ID and Target NF Group ID. Table 500 represents an enhancement to the access token request type table in the above-referenced 3GPP TS 29.510.

FIG. 6 illustrates a table 600 of access token claim types, according to an illustrative embodiment. Note that the bottom of the table indicates the attribute name and description for new Dataset ID and Target NF Group ID. The Type AccessTokenClaims is enhanced to include a new claim called "allowedResources". This contains resource URIs of all the resources that the NF service consumer can access in the NF producer. Furthermore, a new attribute "allowedNF-Group Id" is introduced. In some embodiments, this attribute contains a white list of allowed NF Group Ids or a black list of NF Group Ids that the consumer is not allowed to target. Table 600 is an enhancement of the access token claim type table in TS 29.510. In some embodiments, the allowedResources claim is mandatorily included when the target NF producer is a UDR.

Figure 7:
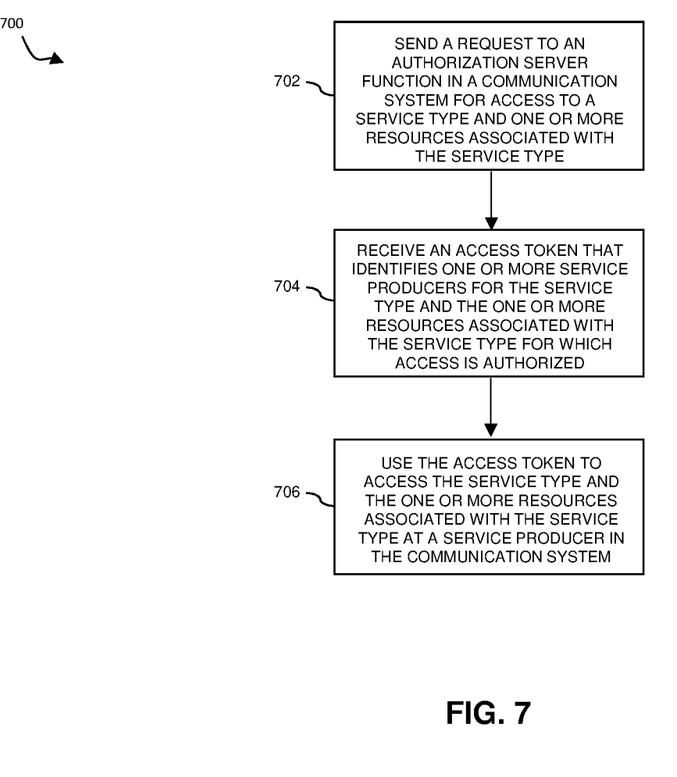
FIG. 7 illustrates a secure allowed-resource access control methodology in a communication system, according to an illustrative embodiment.

FIG. 7 illustrates a secure allowed-resource access control methodology 700 from the perspective of a requesting service consumer in a communication system, according to an illustrative embodiment. As shown, step 702 sends a request to an authorization server function in a communication system for access to a service type and one or more resources associated with the service type. Step 704 receives an access token that identifies one or more service producers for the service type and the one or more resources associated with the service type for which access is authorized. Step 706 uses the access token to access the service type and the one or more resources associated with the service type at a service producer in the communication system. As mentioned, the steps of the method are performed by a service consumer of the communication system.

Figure 8:
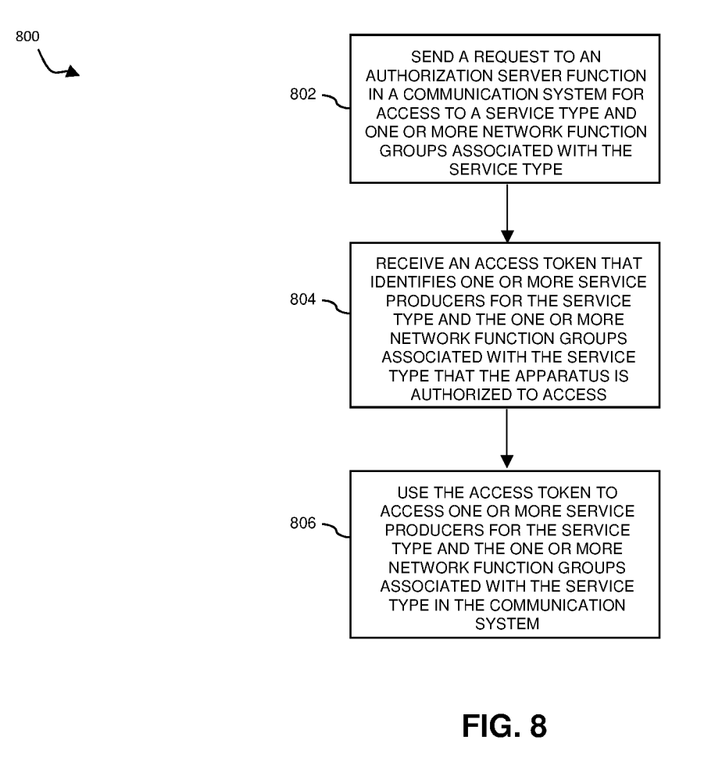
FIG. 8 illustrates a secure allowed-group access control methodology in a communication system, according to an illustrative embodiment.

FIG. 8. illustrates a secure allowed-group access control methodology 800 from the perspective of a requesting service consumer in a communication system, according to an illustrative embodiment. As shown, step 802 sends a request to an authorization server function in a communication system for access to a service type and one or more network function groups associated with the service type. Step 804 receives an access token that identifies one or more service producers for the service type and the one or more network function groups associated with the service type that the apparatus is authorized to access. Step 806 uses the access token to access one or more service producers for the service type and the one or more network function groups associated with the service type in the communication system. As mentioned, the steps of the method are performed by a service consumer of the communication system.

Note that as mentioned above, while FIG. 8 illustrates that the service consumer issues a request that contains one or more group IDs, in alternative embodiments, the request does not contain any group ID. The authorization service function could then issue an access token related with one or more group IDs as appropriate (possibly relating to authorized group IDs or forbidden group IDs) regardless of whether the service consumer request contained a group ID.

The particular processing operations and other system functionality described in conjunction with FIGS. 1-8 are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, authentication and key agreement protocols, key pair provisioning and usage processes, messaging protocols and message formats than those described above in the context of the illustrative embodiments. These and numerous other alternative embodiments within the scope of the appended claims will be readily apparent to those skilled in the art.

We claim:

1. Apparatus comprising:
   at least one processor;
   at least one memory including computer program code;
   the at least one memory and the computer program code being configured to, with the at least one processor, cause the apparatus at least to:
   receive a request from a service consumer in a communication system for access to a service type and one or more resources associated with the service type;
   determine whether the service consumer is authorized to access the service type and the one or more resources associated with the service type;
   generate an access token that identifies one or more service producers for the service type and the one or more resources associated with the service type that the service consumer is authorized to access; and
   send the access token to the service consumer;
   wherein the at least one processor, the at least one memory and the computer program code are part of an authorization server function in the communication system.

2. The apparatus of claim 1, wherein the one or more resources comprise one or more data sets.

3. The apparatus of claim 1, wherein the determining step further comprises the apparatus performing a service level authorization and a resource level authorization to determine access permissions that the access token will contain.

4. The apparatus of claim 3, wherein the at least one memory and the computer program code being further configured to, with the at least one processor, cause the apparatus to send a rejection message to the service consumer when one or more of the service level authorization and the resource level authorization are unsuccessful.

5. The apparatus of claim 1, wherein the service consumer is a network function (NF) and the authorization server function is a network repository function (NRF) in a 5G System.

6. A method comprising:
   receiving a request from a service consumer in a communication system for access to a service type and one or more resources associated with the service type;

determining whether the service consumer is authorized to access the service type and the one or more resources associated with the service type;

generating an access token that identifies one or more service producers for the service type and the one or more resources associated with the service type that the service consumer is authorized to access; and sending the access token to the service consumer;

wherein the steps of the method are performed by an authorization server function in the communication system.

7. The method of claim 6, wherein the one or more resources comprise one or more data sets.

8. The method of claim 6, wherein the determining step further comprises performing a service level authorization and a resource level authorization to determine access permissions that the access token will contain.

9. An article of manufacture comprising a non-transitory computer-readable storage medium having embodied therein executable program code that when executed by the processor associated with the authorization server function causes the authorization server function to perform the steps of claim 6.

10. Apparatus comprising:
at least one processor;
at least one memory including computer program code;
the at least one memory and the computer program code being configured to, with the at least one processor, cause the apparatus at least to:
send a request to an authorization server function in a communication system for access to a service type and one or more resources associated with the service type;
receive an access token that identifies one or more service producers for the service type and the one or more resources associated with the service type that the apparatus is authorized to access; and
use the access token to access the service type and the one or more resources associated with the service type at a service producer in the communication system;
wherein the at least one processor, the at least one memory and the computer program code are part of a service consumer in the communication system.

11. The apparatus of claim 10, wherein the one or more resources comprise one or more data sets.

12. The apparatus of claim 10, wherein the access token contains access permissions determined by a service level authorization and a resource level authorization.

13. The apparatus of claim 12, wherein the at least one memory and the computer program code being further configured to, with the at least one processor, cause the apparatus to receive a rejection message when one or more of the service level authorization and the resource level authorization are unsuccessful.

14. The apparatus of claim 10, wherein the service consumer is a network function (NF) and the authorization server function is a network repository function (NRF) in a 5G System.

15. A method comprising:
sending a request to an authorization server function in a communication system for access to a service type and one or more resources associated with the service type;
receiving an access token that identifies one or more service producers for the service type and the one or more resources associated with the service type for which access is authorized; and
using the access token to access the service type and the one or more resources associated with the service type at a service producer in the communication system;
wherein the steps of the method are performed by a service consumer of the communication system.

16. The method of claim 15, wherein the one or more resources comprise one or more data sets.

17. The method of claim 15, wherein the access token contains access permissions determined by a service level authorization and a resource level authorization.

18. An article of manufacture comprising a non-transitory computer-readable storage medium having embodied therein executable program code that when executed by the processor associated with the service consumer causes the service consumer to perform the steps of claim 15.

* * * * *